(12) United States Patent
Maxwell

(10) Patent No.: US 9,753,174 B2
(45) Date of Patent: Sep. 5, 2017

(54) GEOPHYSICAL SURVEY NODE ROLLING METHOD AND SYSTEM

(71) Applicant: CGG SERVICES SA, Massy (FR)

(72) Inventor: Peter Maxwell, Missouri City, TX (US)

(73) Assignee: CGG SERVICES SAS, Massy (FR)

( * ) Notice: Subject to any disclaimer, the term of this patent is extended or adjusted under 35 U.S.C. 154(b) by 935 days.

(21) Appl. No.: 14/036,162

(22) Filed: Sep. 25, 2013

(65) Prior Publication Data

US 2015/0084783 A1    Mar. 26, 2015

(51) Int. Cl.
| | | |
|---|---|---|
| G01V 3/00 | (2006.01) | |
| G01V 3/20 | (2006.01) | |
| G01V 1/20 | (2006.01) | |
| G01V 1/24 | (2006.01) | |
| G01V 1/16 | (2006.01) | |

(52) U.S. Cl.
CPC ............... *G01V 3/20* (2013.01); *G01V 1/168* (2013.01); *G01V 1/20* (2013.01); *G01V 1/247* (2013.01)

(58) Field of Classification Search
None
See application file for complete search history.

(56) References Cited

U.S. PATENT DOCUMENTS

| | | | | |
|---|---|---|---|---|
| 4,661,934 A * | 4/1987 | Carruth, Jr. | ............... | G01V 1/24 346/33 C |
| 5,185,700 A * | 2/1993 | Bezos | ....................... | B60L 3/12 340/870.41 |
| 5,287,266 A * | 2/1994 | Malec | .................... | B62B 3/1408 340/3.3 |
| 5,835,025 A * | 11/1998 | Zufelt | .................... | G01D 9/005 340/580 |
| 6,474,254 B1 * | 11/2002 | Ambs | .................... | B63B 21/66 114/312 |

(Continued)

FOREIGN PATENT DOCUMENTS

| | | |
|---|---|---|
| FR | 2 904 118 A1 | 1/2008 |
| GB | 2466560 B | 3/2011 |
| WO | 2012/009034 A1 | 1/2012 |

OTHER PUBLICATIONS

Office Action in corresponding European Application No. EP 14 18 5962.9 dated Nov. 20, 2015 (Reference D1 was submitted with an Information Disclosure Statement on Jul. 5, 2014.).

(Continued)

*Primary Examiner* — Curtis King
(74) *Attorney, Agent, or Firm* — Patent Portfolio Builders PLLC

(57) ABSTRACT

A method for acquiring geophysical data includes connecting a power module comprising a data transfer port and a power transfer port to a geophysical data acquisition device to provide a geophysical sensing node and deploying the geophysical sensing node. While deployed, data is transferred from the geophysical data acquisition device to the power module via the data transfer port and power is transferred from the power module to the geophysical data acquisition device via the power transfer port. The method also includes retrieving the geophysical sensing node and replacing the power module with a newly charged power module to provide a newly charged geophysical sensing node, and deploying the newly charged geophysical sensing node. Corresponding systems are also disclosed herein.

17 Claims, 14 Drawing Sheets

(56) References Cited

U.S. PATENT DOCUMENTS

| | | | |
|---|---|---|---|
| 7,526,944 B2 | 5/2009 | Sabata et al. | |
| 7,646,670 B2 | 1/2010 | Maxwell et al. | |
| 8,180,595 B2 | 5/2012 | Daniels et al. | |
| 9,168,384 B2* | 10/2015 | Askarinya | A61N 1/375 |
| 2001/0030526 A1* | 10/2001 | Bohne | H02J 7/0009 |
| | | | 320/150 |
| 2002/0128051 A1 | 9/2002 | Liebenow | |
| 2004/0105533 A1* | 6/2004 | Iseli | G01V 1/003 |
| | | | 379/106.01 |
| 2004/0233043 A1 | 11/2004 | Yazawa et al. | |
| 2006/0200038 A1* | 9/2006 | Savit | A61B 5/0476 |
| | | | 600/544 |
| 2007/0057839 A1* | 3/2007 | Kagawa | G01S 19/14 |
| | | | 342/357.27 |
| 2007/0229350 A1* | 10/2007 | Scalisi | G06F 21/35 |
| | | | 342/350 |
| 2008/0062815 A1 | 3/2008 | Iseli | |
| 2008/0114548 A1 | 5/2008 | Pavel et al. | |
| 2009/0061418 A1* | 3/2009 | Kriz | A61B 5/14546 |
| | | | 435/5 |
| 2010/0097889 A1* | 4/2010 | Golparian | G01V 1/22 |
| | | | 367/77 |
| 2010/0156193 A1* | 6/2010 | Rhodes | G06F 1/1632 |
| | | | 307/104 |
| 2011/0074349 A1 | 3/2011 | Ghovanloo | |
| 2012/0008460 A1* | 1/2012 | Crice | G01V 1/24 |
| | | | 367/37 |
| 2013/0058192 A1 | 3/2013 | Gateman et al. | |
| 2013/0176817 A1 | 7/2013 | Crice | |
| 2014/0219051 A1* | 8/2014 | Pavel | G01V 1/162 |
| | | | 367/15 |
| 2015/0089089 A1* | 3/2015 | Holst | G01V 1/247 |
| | | | 710/8 |
| 2016/0028238 A1* | 1/2016 | Isfeldt | G01V 1/38 |
| | | | 320/108 |

OTHER PUBLICATIONS

Mesa Systems Co., "Inductive Power/Data Coupling Devices, MESA Air-Gap Inductive Power Coupling Devices—with and without Data Communications", downloaded from the internet Oct. 17, 2014 (http://www.mesasystemsco.com/category.php?cat=2).

* cited by examiner

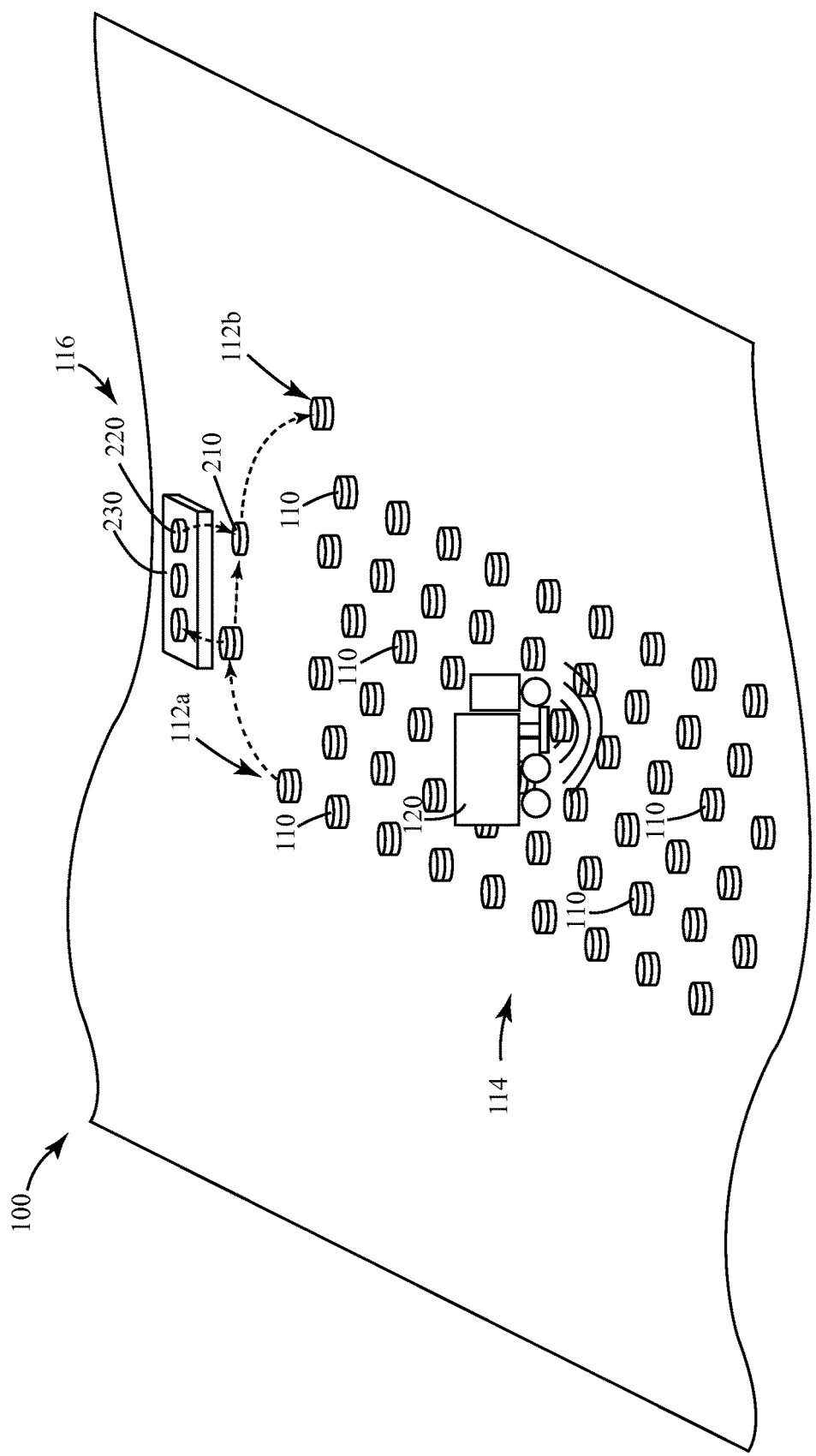

220, 220a 220, 220c

GEOPHYSICAL SURVEY NODE ROLLING METHOD AND SYSTEM

BACKGROUND

Technical Field

Embodiments of the subject matter disclosed herein generally relate to the field of geophysical data acquisition and aggregation. In particular, the embodiments disclosed herein relate to a modular autonomous geophysical data recording device and a method and system for managing such devices during a geophysical survey.

Discussion of the Background

Geophysical data is useful for a variety of applications such as weather and climate forecasting, environmental monitoring, agriculture, mining, and seismology. As the economic benefits of such data have been proven, and additional applications for geophysical data have been discovered and developed, the demand for localized, high-resolution, and cost-effective geophysical data has greatly increased. This trend is expected to continue.

For example, seismic data acquisition and processing may be used to generate a profile (image) of the geophysical structure under the ground (either on land or seabed). While this profile does not provide an exact location for oil and gas reservoirs, it suggests, to those trained in the field, the presence or absence of such reservoirs. Thus, providing a high-resolution image of the subsurface of the earth is important, for example, to those who need to determine where oil and gas reservoirs are located.

Traditionally, a land seismic survey system 10 capable of providing a high-resolution image of the subsurface of the earth is generally configured as illustrated in FIG. 1a (although many other configurations are used). System 10 includes plural receivers 12 and acquisition units 12a positioned over an area 13 of a subsurface to be explored and in contact with the surface 14 of the ground. A number of vibroseismic or other types of sources 16 are also placed on surface 14 in an area 17, in a vicinity of area 13 of receivers 12. A recording device 18 is connected to a plurality of receivers 12 and placed, for example, in a station-truck 20. Each source 16 may be composed of a variable number of vibrators or explosive devices, typically between 1 and 5, and may include a local controller 22. A central controller 24 may be present to coordinate the shooting times of the sources 16. A GPS system 26 may be used to time-correlate sources 16 and receivers 12 and/or acquisition units 12a.

With this configuration, sources 16 are controlled to generate seismic waves, and the receivers 12 record waves reflected by the subsurface. Typically, the receivers 12 and acquisition units 12a are connected to each other and the recording devices with cables 30.

When surveying larger areas, it is desirable to maintain a certain density of receivers 12 over a given area in order to provide data of sufficient quality to accurately image the subsurface. However, covering such a large area, with the same density of receivers 12 as used in a smaller survey, may not be practical, particularly when the receivers 12 are interconnected with cables. As a result, larger surveys often "roll" a set of cable-free autonomous receiving units (referred to individually as "nodes" and collectively as a "spread") that are equipped with batteries. In such rolling surveys, recovery of the data from each geophysical sensing node may be time consuming, often requiring the nodes to be brought to staging area for a period of time. In the staging area the batteries are also recharged, or removed and replaced. During this time the node is out of service and so a large "float" of nodes is required to facilitate operations.

While "rolling" the nodes in a survey facilitates surveying a large area with a limited number of nodes, a certain portion of the nodes are relegated to the staging area for servicing often resulting in operational delays and increased costs. Given the foregoing, there is a need of a better method and system for rolling the nodes of an active spread. In response thereto, the inventors have developed a modular autonomous geophysical sensing unit, described in co-pending U.S. patent application Ser. No. 14/048,440, entitled "GEOPHYSICAL DATA ACQUISITION AND POWER TRANSFER METHOD APPARATUS AND SYSTEM", which is incorporated herein by reference. Furthermore, a method and system that leverage such modular sensing units and simplify the node rolling process are described herein.

SUMMARY

As detailed herein, a method for rolling geophysical sensing nodes includes connecting a power module including a data transfer port and a power transfer port to a geophysical data acquisition device to provide a geophysical sensing node and deploying the geophysical sensing node. While deployed, data is transferred from the geophysical data acquisition device to the power module via the data transfer port and power is transferred from the power module to the geophysical data acquisition device via the power transfer port. The method also includes retrieving the geophysical sensing node and replacing the power module with a newly charged power module to provide a newly charged geophysical sensing node, and deploying the newly charged geophysical sensing node. Corresponding systems are also disclosed herein.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 1b is a schematic diagram depicting a rolling geophysical survey system;

DETAILED DESCRIPTION

Figure 1A:
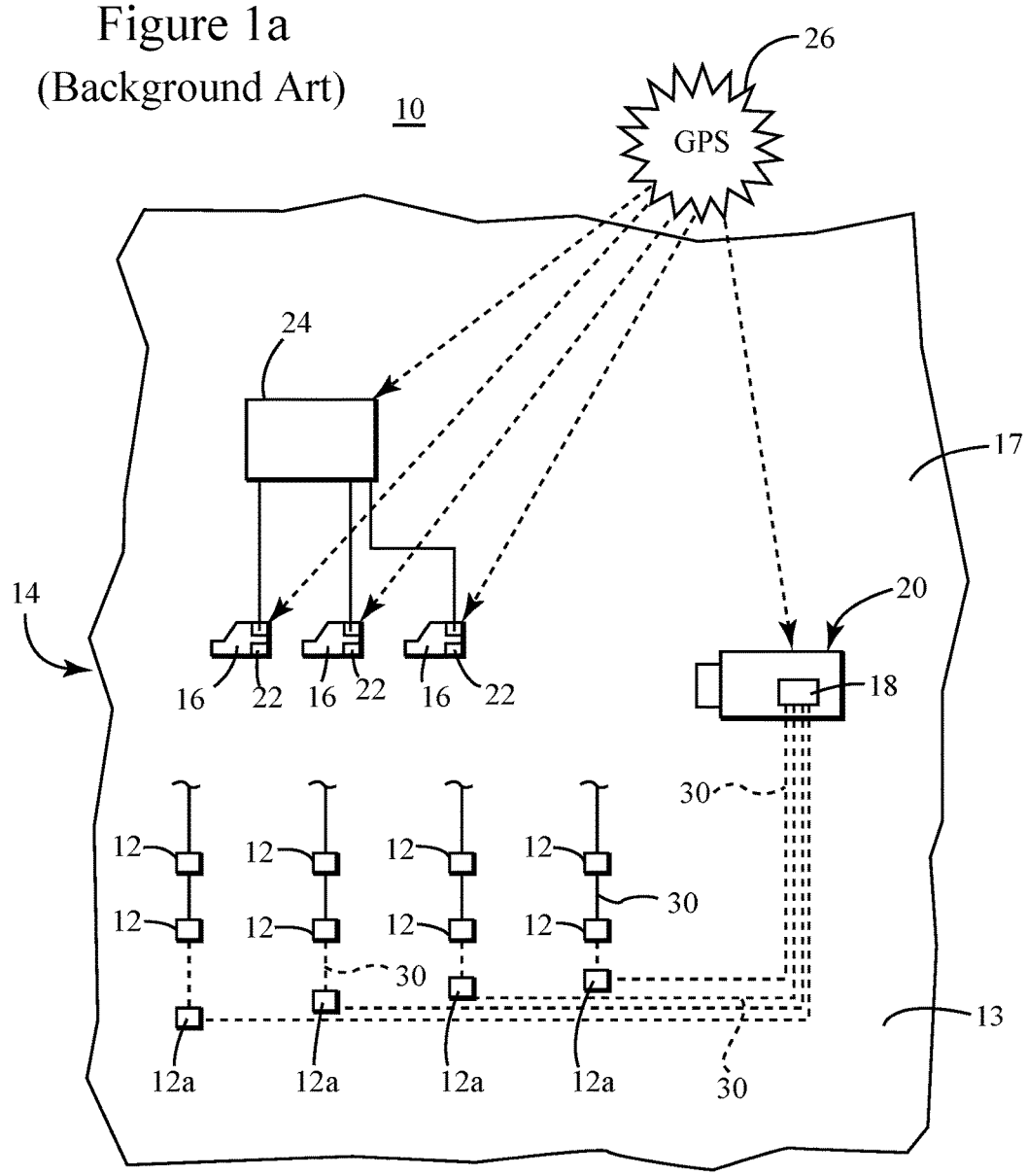
FIG. 1a is a schematic diagram depicting a traditional land seismic survey system.

The following description of the exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Some of the elements disclosed herein and shown in the drawings have a numeric reference identifier with a letter suffix (e.g., 200c) that indicates a specific embodiment or configuration of the particular element. Furthermore, a reference in the specification to a numeric reference identifier without a letter suffix (e.g., 200) may also refer to each specific embodiment shown in the drawings (e.g., 200a, 200b, 200c).

As mentioned briefly in the background section, data is often collected for a geophysical survey by "rolling" an array of geophysical sensing nodes referred to as a "spread." Specifically, as shown in FIG. 1b, geophysical sensing nodes 110 are removed from a trailing edge 112a of a rolling spread 114 of a rolling geophysical survey 100 and serviced in a staging area 116 to extract the data therefrom. Traditionally, the geophysical sensing nodes 110 are further serviced by recharging or replacing the batteries. After servicing, the nodes 110 are redeployed at the leading edge 112b of the rolling spread.

To reduce or eliminate operational delays associated with the above traditional approach, the number of nodes 110 is preferably greater than the average node servicing time (e.g., 6 hours) multiplied by the average rate that nodes can by removed from the field (e.g., 20 per hour). Consequently, in traditional rolling techniques the required number of nodes that are relegated to the staging area 116 may be quite high (e.g., 120 nodes).

Rather than relegate the entire geophysical sensing node 110 to the staging area 116, the embodiments disclosed herein modularize the geophysical sensing nodes 110 into a geophysical data acquisition device 210 and a power module 220 that has data storage capabilities. Therefore, instead of servicing the entire geophysical sensing node 110, the power module 220 may be separated from the geophysical data acquisition device 210 and serviced while the geophysical data acquisition device is immediately paired with a recharged power module 220 and redeployed to the leading edge 112b of the active spread 114.

One of skill in the art will appreciate that the described power module 220 may be much less expensive than an entire geophysical sensing node 110 and that the cost savings for a survey may be quite significant—particularly when the advancement rate for a survey can be increased over traditional advancement rates resulting in reduced manpower and equipment costs.

In the depicted embodiment, the geophysical sensing nodes 110 are seismometers that acquire geophysical data in response to environmental seismic sources (not shown) or induced seismic sources such as the seismic source 120. In addition to, or instead of seismometers, the geophysical sensing nodes 110 may include a geophone, one or more accelerometers, or other known seismic sensors. Furthermore, although the rolling geophysical survey 100 depicted in FIG. 1b is a seismic survey, the embodiments disclosed herein are not limited to seismic surveys.

Figure 2A:
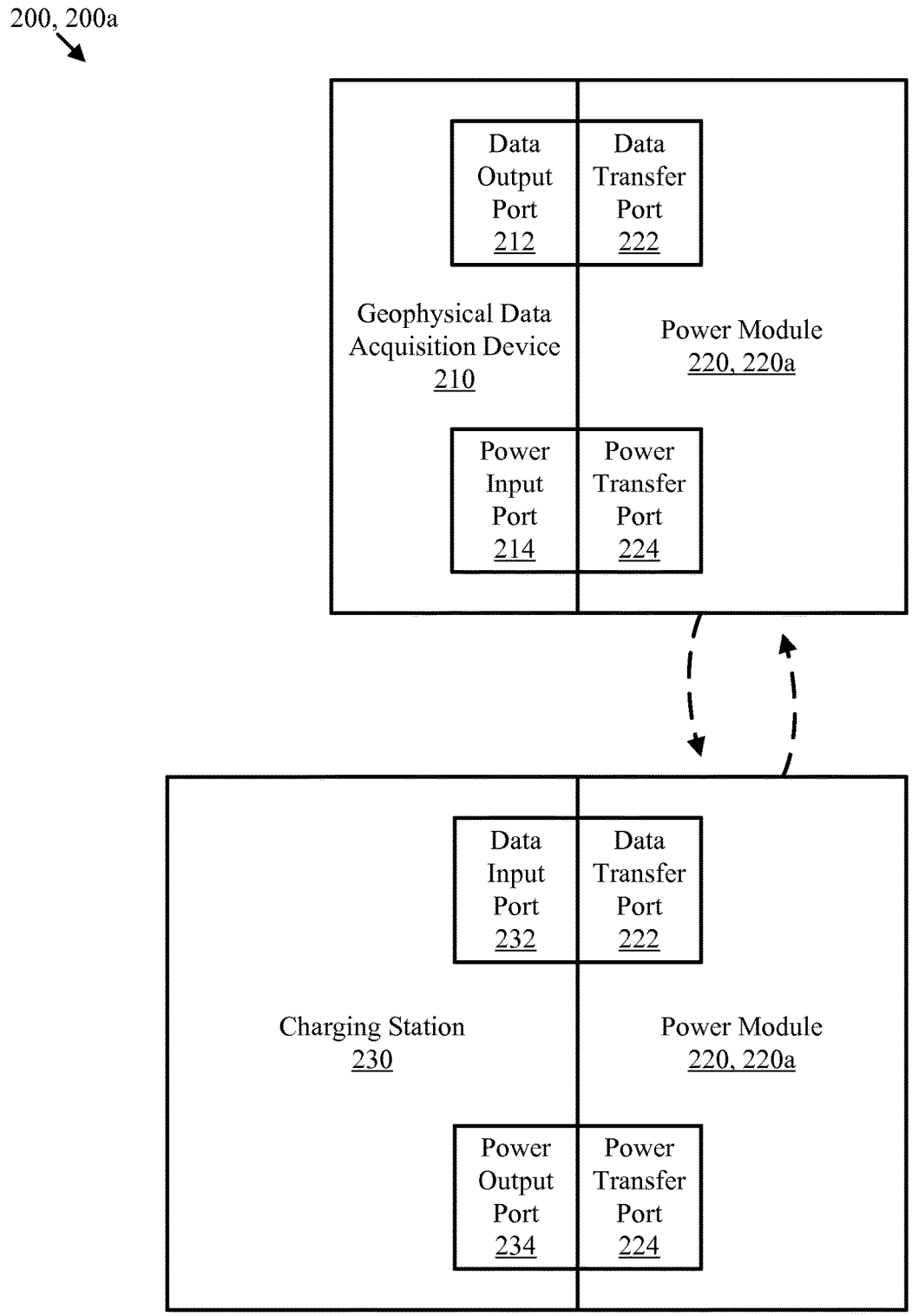
FIGS. 2a-2c are block diagrams depicting several embodiments of a modular geophysical data acquisition system.
Figure 2B:
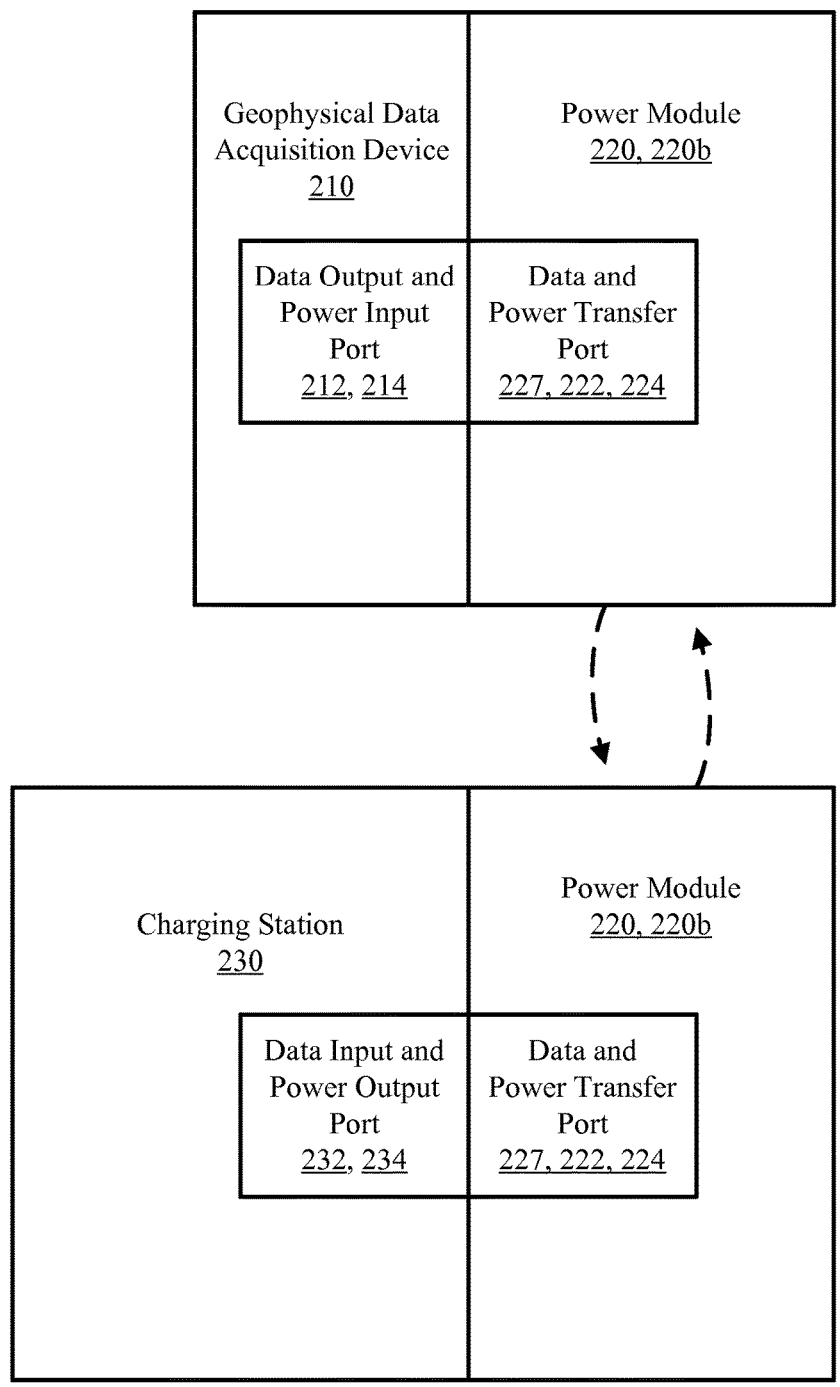
Figure 2C:
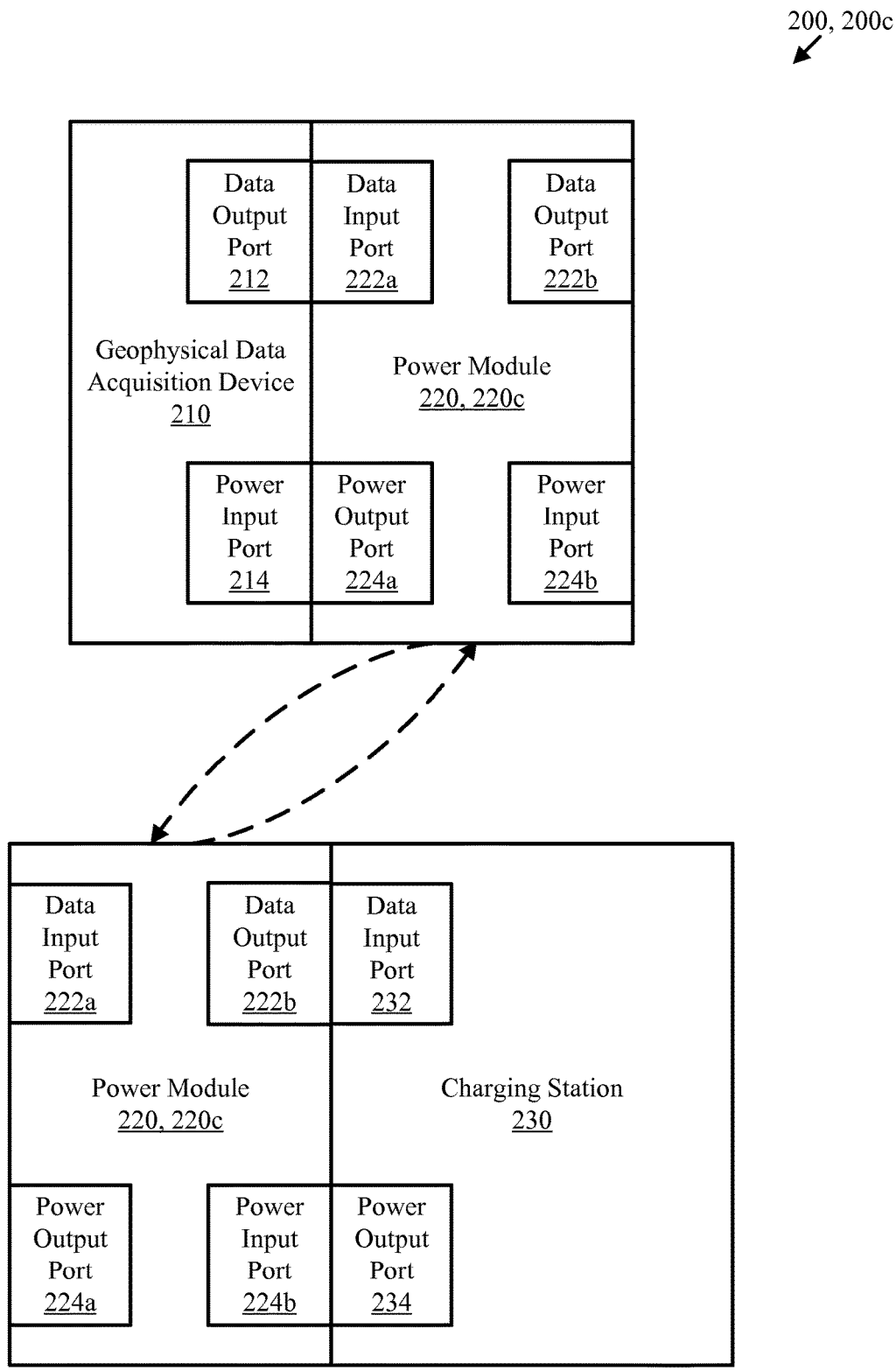

FIGS. 2a-2c are block diagrams depicting several embodiments of a modular geophysical data acquisition system 200. The modular geophysical data acquisition system 200 may include a plurality of geophysical data acquisition devices 210, power modules 220, and one or more charging stations 230. For purposes of simplicity, a single geophysical data acquisition device 210 and a single charging station 230 is shown in each of the figures along with two power modules 220 that may be swapped to facilitate data transfer and power transfer between each geophysical data acquisition device 210 and one or more charging stations 230. FIGS. 2a-2c depict the geophysical data acquisition devices 210, the power modules 220, and the charging stations 230 on a system level that focuses on the interfaces of the devices and omits many of the internal features. For example, each of the devices 210, 220, and 230 may have internal memory and a controller (e.g., a CPU) incorporated therein. For additional details of each of the devices 210, 220, and 230, see FIGS. 4, 6a-c, and 5, respectively.

The power modules 220 may be charged at a charging station 230 by connecting the power transfer port 224 of the power module 220 to the power output port 234 of a charging station 230. Concurrent with charging the power module 220, data may be transferred from the power module 220 to the charging station 230 by connecting the data transfer port 222 to the data input port 232 of the charging station 230.

In a similar manner, data may be transferred from a geophysical data acquisition device 210 to a power module 220 by connecting the data transfer port 222 to the data output port 212 of a geophysical data acquisition device 210 and power may be transferred from the power module 220 to a geophysical data acquisition device 210 by connecting the power transfer port 224 of the power module 220 to the power input port 214 of a geophysical data acquisition device 210.

By using the power modules 220 as intermediary devices in the described manner, power is transferred from the charging station 230 to the geophysical data acquisition device 210 and data is transferred from the geophysical data acquisition device 210 to the charging station 230. Furthermore, the transfer of data and power may be conducted as a background process while enabling immediate re-deployment of the geophysical data acquisition device 210.

With each device depicted in the system 200, the simultaneous transfer of data and power may occur in that the data ports and the power ports of each device may be simultaneously connected. FIG. 2a depicts an embodiment 200a in which the power module 220 has one bidirectional port 222 for data transfer and one bidirectional port 224 for power transfer. FIG. 2b depicts an embodiment 200b in which the power module 220 has single bidirectional port 227 for both power and data transfer. In contrast, FIG. 2c depicts an embodiment 200c in which the power module 220 has two unidirectional ports 222a and 222b for data transfer and two unidirectional ports 224a and 224b for power transfer. In each of the FIGS. 2a-2c the data and power ports on the data acquisition devices 210 and the charging stations 230 are appropriately configured to connect to the depicted configurations of the respective power modules 220.

In the depicted embodiments, the various ports may be wired ports such as Ethernet RJ45 ports, serial data ports, parallel data ports, USB ports, and Firewire ports. The electrical connections required for wired ports may be achieved by using one or more connection cables, or by directly connecting ports to each other without the use of a connection cable.

The various ports may also be wireless ports, such as RF ports (e.g., WiFi, Microwave, Radio ports), optical ports (e.g., IR, Visible, or UV ports), sonically driven ports, or inductively-coupled ports. The use of wireless ports may facilitate deployment in harsh environments. The closeness required for an effective wireless connection that facilitates data and/or power transfer may be dependent on the technology used for data transfer and power transfer. For example, inductively-coupled wireless ports may require a closer proximity than RF wireless ports.

One of skill in the art will appreciate that the transfer of data and/or power for many of the described ports occurs via a modulated electric or magnetic field. The ports may transmit both data and power, or they may be separated into dedicated power transmission ports and data transmission ports. For example, power transfer may occur via an inductively-coupled port and data could be transmitted by other means, e.g. a wired connection, Wi-Fi, short range wireless, sonic, or optical means. One of skill in the art will also appreciate that the embodiments 200a-c are representative examples of power and data transfer and that other configurations are achievable and may be desirable for particular applications.

Figure 3:
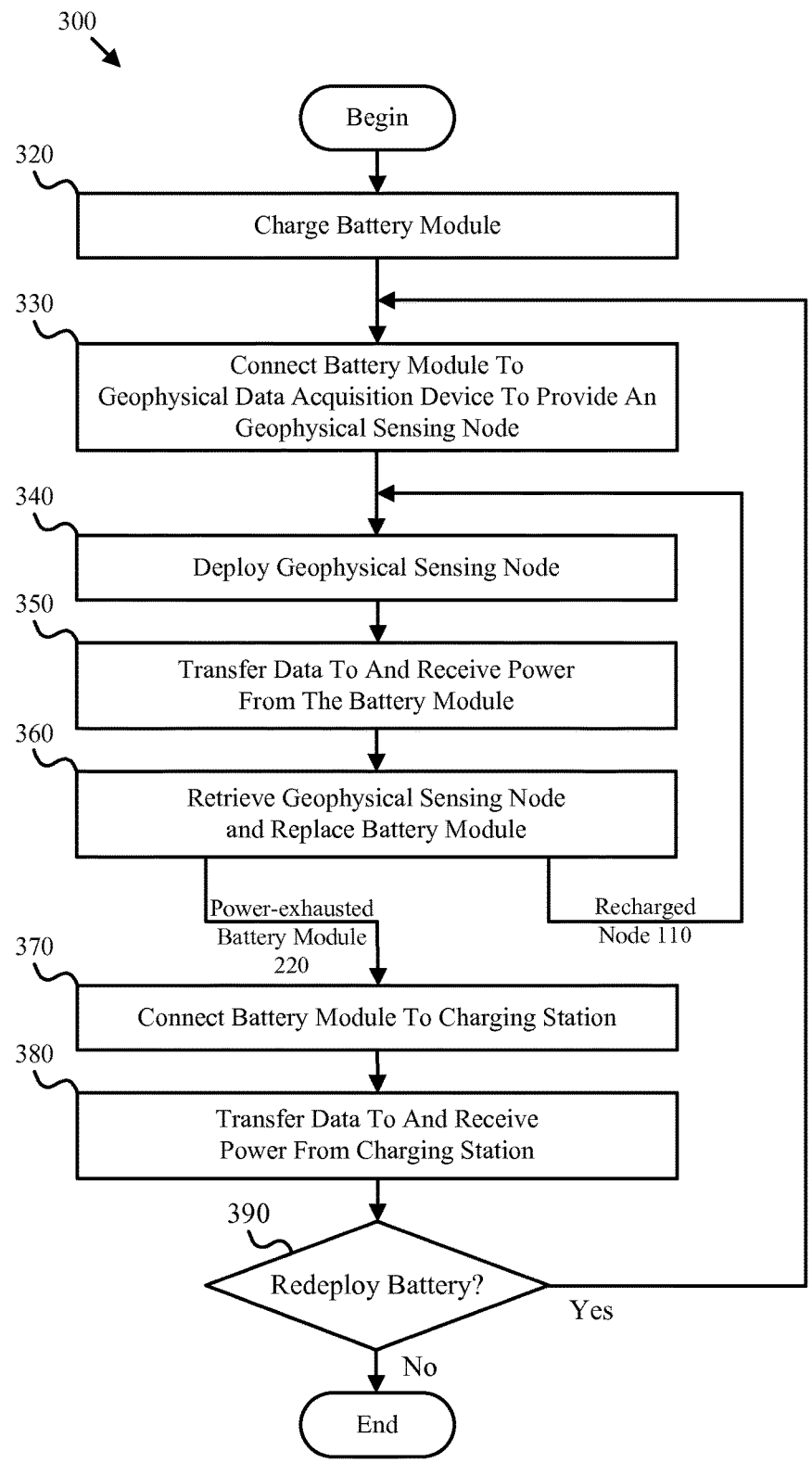
FIG. 3 is a flowchart diagram of a rolling geophysical survey method.

FIG. 3 is a flowchart diagram of a rolling geophysical survey method 300. As depicted, the rolling geophysical survey method 300 includes charging 320 the power module, connecting 330 the power module to a geophysical data acquisition device to provide a geophysical sensing node, deploying 340 the geophysical sensing node, transferring 350 data to and receiving power from the power module, retrieving 360 the geophysical sensing node and replacing the power module, connecting 370 the power-exhausted power module to a charging station, transferring 380 data to and receiving power from the charging station, and ascertaining 390 whether the power module is to be redeployed. The depicted rolling geophysical survey method may be conducted in conjunction with the rolling geophysical survey system 100 and the various embodiments of modular geophysical data acquisition system 200.

Charging 320 the power module may include connecting a power module 220 to a charging station 230 or placing the power module 220 adjacent to the charging station 230 such that the power output port 234 of the charging station 230 is connected to the power transfer port 224 of the power module 220. Charging 320 the power module may also include providing power to the power module 220 until a battery contained therein is fully charged. In conjunction with charging 320 the power module, a data transfer memory 226 associated with the power module 220 (see FIGS. 6a-c) may be cleared or erased. Charging 320 may, or may not, include physically connecting the power module to the charging station 230.

Connecting 330 the power module to a geophysical data acquisition device may include connecting the power transfer port 224, and the data transfer port 222, of the power module 220, to corresponding ports of a geophysical data acquisition device 210. The ports may be wired ports that require establishing an electrical connection via a cable or connector, or wireless ports that can be connected by placing the power module 220 adjacent to the geophysical data acquisition device 210. Connecting 330 may also include, but does not require, physically binding the devices 210 and 220 together to avoid device separation during deployment. Once connected, the devices 210 and 220 may form a geophysical sensing node 110.

Deploying 340 the geophysical sensing node may include deploying the connected power module 220 and geophysical data acquisition device 210 as a modular geophysical sensing node 110 within a survey such as the rolling geophysical survey 100 depicted in FIG. 1b. Transferring 350 data to and receiving power from the power module may include transferring geophysical data from the geophysical data acquisition device 210 to the power module 220 and transferring power from the power module 220 to the geophysical data acquisition device 210. Data may be transferred by the data transfer port 222 of the power module 220 and power may be transferred by the power transfer port 224. The transfer of data and power may occur while the power module 220 is connected to the geophysical data acquisition device 210 and may occur concurrently or sequentially. Data corresponding to a single channel or multiple channels may be transferred. Data checksums or handshaking confirmation packets may be transferred as a safeguard to data loss.

A novel aspect of the method 300 and the devices 210 and 220 is that power transfer and data transfer may be conducted while the devices 210 and 220 are deployed as an autonomous unit and actively acquiring data. Furthermore, the transfer of power and data need not be continuous and may be conducted independently of each other. For example, in certain applications the transfer of power may be substantially continuous while the transfer of data may be conducted in bursts. Moreover, when deployed, the devices 210 and 220 need not be continuously active. For example, the devices 210 and 220 may have a scheduling table within their memory that indicates intervals where the devices are scheduled to sleep, actively acquire data, or acquire data in response to a triggering event. The scheduling table may also indicate whether power transfer and/or data transfer should be conducted over a particular interval.

Retrieving 360 the geophysical sensing node and replacing the power module may include retrieving the geophysical sensing node 110 and replacing the power module 220, which may be partially or fully exhausted of power, with a newly charged power module 220 to provide a recharged geophysical sensing node 110. The recharged geophysical sensing node 110 with the newly charged power module 220 may then be redeployed via the deploying operation 340 while the power-exhausted power module 220 may be routed to the connecting operation 370 and the transferring operation 380.

Connecting 370 the power-exhausted power module to a charging station may include connecting the power transfer port 224, and the data transfer port 222, of the power module 220, to corresponding ports of a charging station 230.

Transferring 380 data to, and receiving power from, the charging station may include transferring the geophysical data that was collected from the geophysical data acquisition device 210 to the charging station 230 to facilitate analysis. Furthermore, power may be simultaneously transferred from the charging station 230 to the power-exhausted power module 220 while data is transferred from the power module 220 to the charging station 230.

Ascertaining 390 whether the power module is to be redeployed may include determining whether a survey is to be continued. If the power module is to be redeployed, the method may loop to the charging operation 320. Otherwise the method may terminate or exit.

Figure 4:
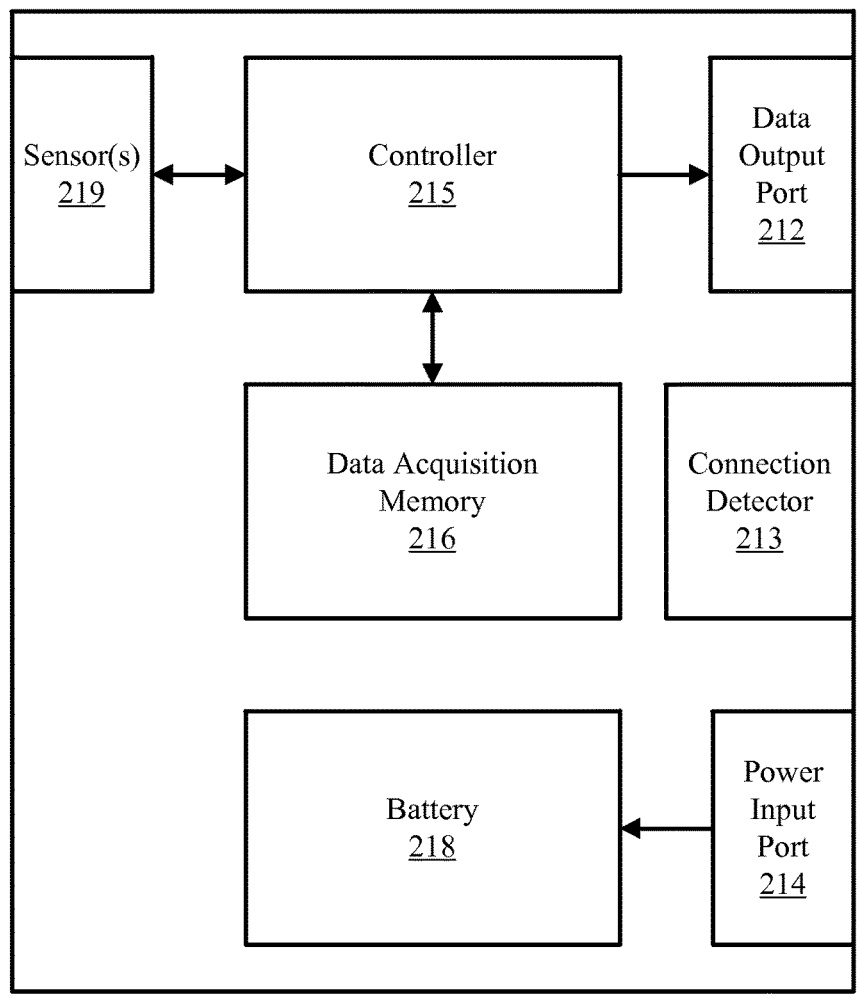
FIG. 4 is a block diagram depicting one embodiment of a geophysical data acquisition device.

FIG. 4 is a block diagram depicting one embodiment of a geophysical data acquisition device 210. As depicted, the geophysical data acquisition device 210 includes a data output port 212, a connection detector 213, a power input port 214, a controller 215, a data acquisition memory 216, a battery 218, and one or more sensors 219. Sensor 219 may be a geophone, an accelerometer, or other known sensors in the field. In one application, sensor 219 includes a combination of traditional sensors.

Sensors 219 may provide geophysical sensor data that facilitates geophysical processing. The data acquisition memory 216 may be used to store the geophysical sensor data provided by the sensors 219 and retrieve that data for transmission by the data output port 212. Sensor data corresponding to a single data channel or multiple data channels may be stored in the data acquisition memory 216.

The data output port 212 may enable transmission/extraction of the geophysical data recorded by the device 210 within the data acquisition memory 216. The data output port 212 may be wired port, which requires electrical connectivity to an external port in order to operate, or a wireless port, which does not require electrical connectivity with an external port in order to operate. Eliminating the need for electrical connectivity may increase the reliability of the geophysical data acquisition device 210 and enable deployment in harsh environments. In one embodiment, the data output port is an Ethernet port. In another embodiment, the data output port 212 is an inductively-coupled port that encodes data by modulating a magnetic flux emitted by the port 212.

The power input port 214 may enable providing power to the device 210. In one embodiment, the power input port 214 is a wireless inductively-coupled port that converts an alternating magnetic flux into an AC or DC supply voltage and/or current. In some embodiments, the data output port 212 and the power input port 214 are combined into a common port (see FIG. 2b). For example, both power and data could be transferred by combined ports 212, 214 that conform to the Power Over Ethernet (POE) standard or by combined inductively coupled ports 212, 214 that modulate the amplitude, frequency, or phase of an alternating magnetic flux.

The connection detector 213 may detect when the data output port 212 and/or the power input port 214 are connected to corresponding ports on a power module 220 or the like. The connection detector 213 may alert the controller 215 when such a connection occurs.

The controller 215 may be a microcontroller, an embedded state machine, or the like. The controller 215 may initialize the components of the geophysical data acquisition device 210 and respond to interrupts generated by those components. For example, the controller 215 may respond to an interrupt generated by the connection detector 213 indicating that a connection event has occurred, by the data output port 212 indicating that a data transmission event has completed, or by the sensor(s) 219 indicating that geophysical sensor data is available for storage. In response to such events, the controller 215 may execute specific functions such as storing and retrieving data. The controller 215 may monitor and optimize power transfer through the power input port 214 and data flow rates through the data output port 212.

The battery 218 may be used to accumulate power provided by the power input port 214 and provide power to the device 210 when power is not available from the power input port 214. In some embodiments, the battery 218 is a redundant source of power. In other embodiments, the battery 218 is omitted from the geophysical data acquisition device 210.

The reader may appreciate that the architecture of the modular geophysical data acquisition system 200 and the geophysical data acquisition device 210 enables a number of variations in order and timing of the geophysical data acquisition and power transfer method 300 depicted in FIG. 3. For example, in some embodiments the data acquisition devices 210 may be battery-free devices that need to be connected to power modules 220 in order to collect geophysical data.

In other embodiments, where the data acquisition devices 210 are battery-equipped devices that can operate independently without being connected to a power module 220, the connected configuration may be limited to a certain interval or duration that is sufficient to transfer data from, and power to, the data acquisition devices 210. In one embodiment, the data is stored as normal within an internal memory of the data acquisition device 210 and serves as a back-up until the internal memory is full and it is incrementally overwritten. The back-up data can then be re-collected should the data in the power module 220 become corrupted or lost.

Figure 9:
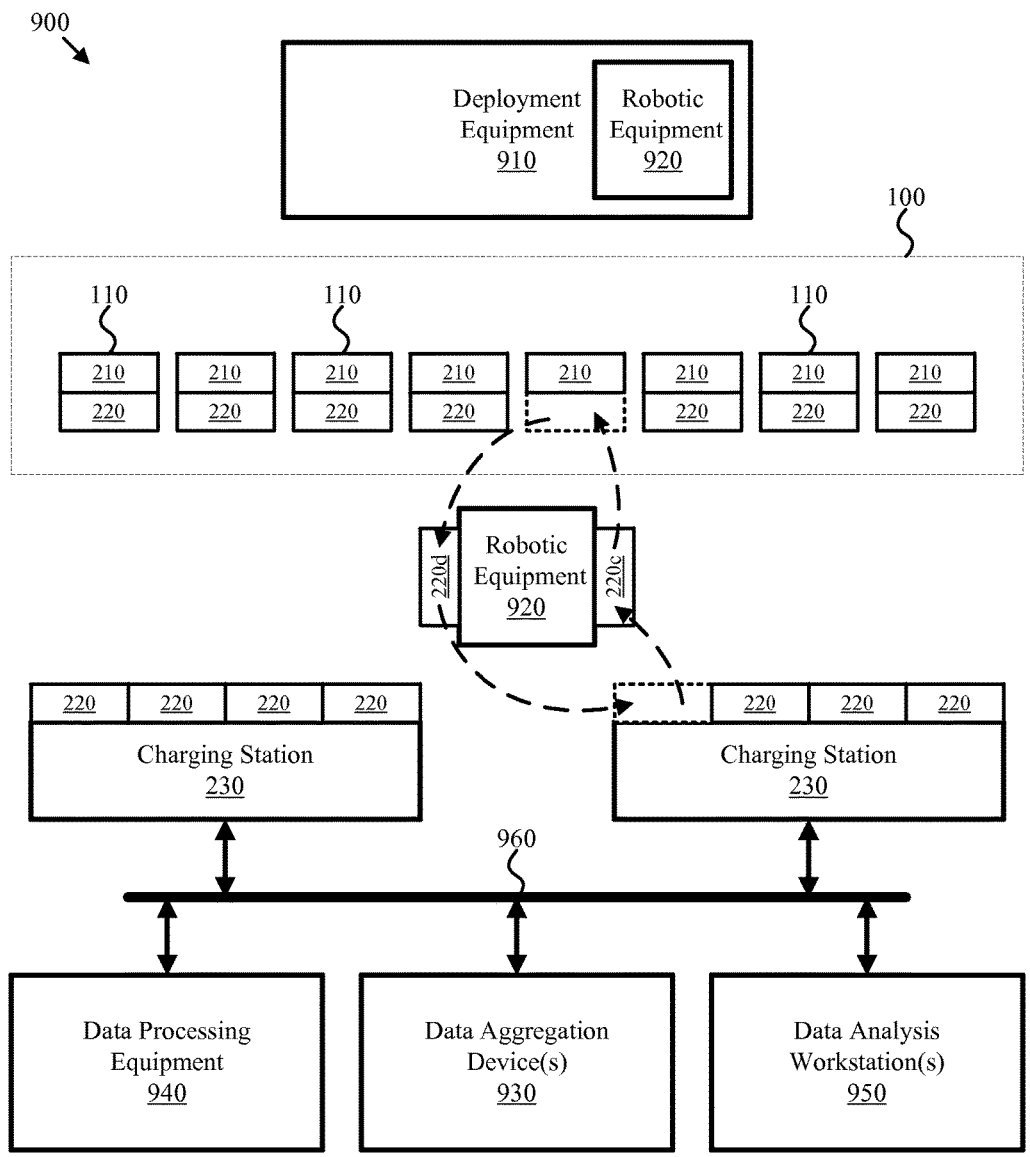
FIG. 9 is a block diagram of a deployment and maintenance system for geophysical sensing.

The architecture and devices presented herein also enable the recording of large volumes of data and efficient uploading to a charging station 230 and/or centralized aggregation or analysis server (see FIG. 9). For example, one or more charging stations 230 may be equipped to concurrently connect with a large number of power modules 220, each of which may burst their recorded data from non-volatile memory such as flash memory. The power modules may be optimized for data and power transfer, yet remain much less costly than an entire geophysical sensing unit. Consequently, the sustainable data transfer rate of the complete data aggregation system may be quite high while reducing costs over conventional solutions.

Figure 5:
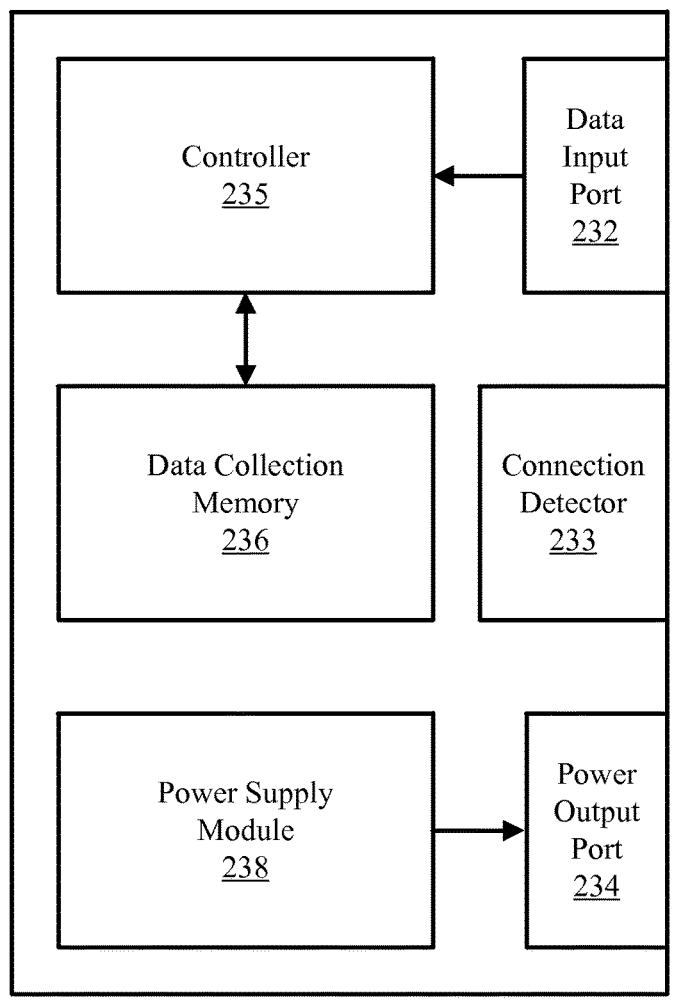
FIG. 5 is a block diagram depicting one embodiment of a charging station.

FIG. 5 is a block diagram depicting one embodiment of a charging station 230. As depicted, the charging station 230 includes a data input port 232, a connection detector 233, a power output port 234, a controller 235, a data collection memory 236, and a power supply 238. FIG. 5 provides additional details on the charging station 230 over those shown in previous figures.

The data input port 232 may enable the charging station 230 to extract geophysical data from a power module 220 or the like. The data collection memory 236 may aggregate such data to enable processing and analysis for a survey such as the rolling geophysical survey 100. The data collection memory 236 may comprise non-volatile storage devices such as flash memory devices or disk storage devices. The power output port 234 may enable providing power to a power module 220. The power supply module 238 may power the charging station 230 and provide power to an attached power module 220 via the power output port 234.

The connection detector 233 may detect when the data input port 232 and/or the power output port 234 are connected to corresponding ports on a power module 220 or the like. The connection detector 233 may alert the controller 235 when such a connection occurs. The controller 235 may initialize the components of the charging station 230 and respond to interrupts generated by those components. For example, the controller 235 may respond to an interrupt generated by the data input port 232 indicating that a data-reception event has occurred. The controller 235 may execute specific functions in response to those events. The controller 235 may be a microcontroller, an embedded state machine, or the like.

Figure 6A:
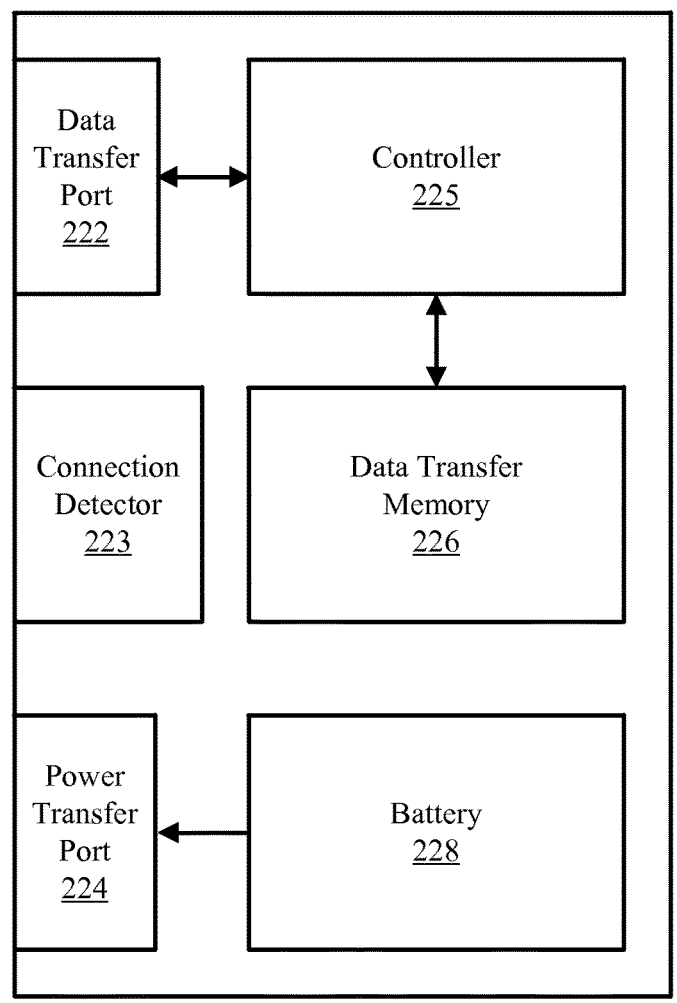
FIGS. 6a-6c are block diagrams depicting several embodiments of a power module.
Figure 6B:
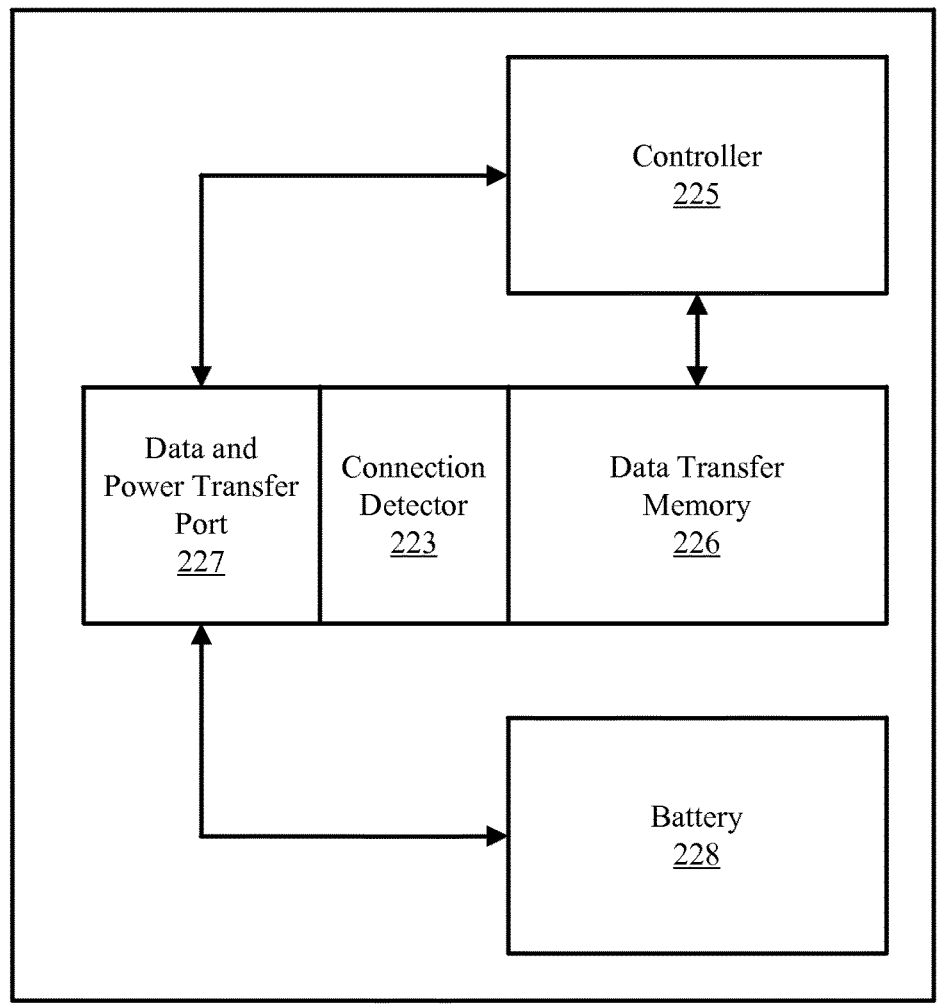
Figure 6C:
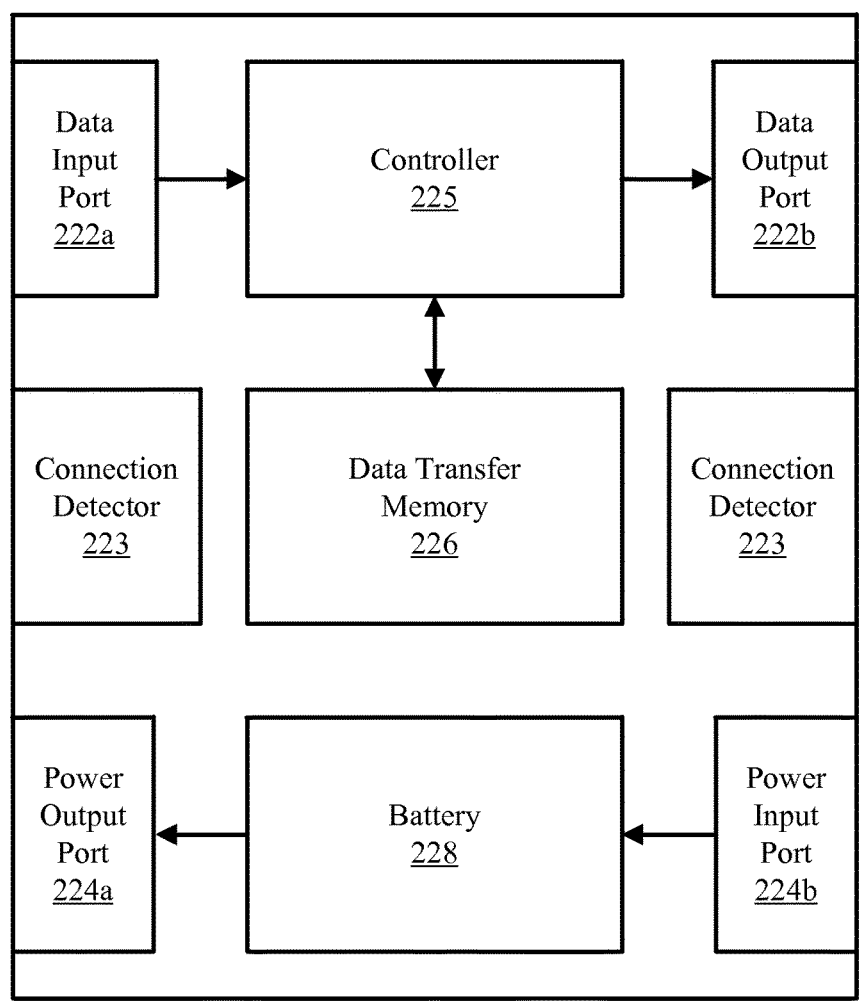

FIGS. 6a-6c are block diagrams depicting several embodiments of a power module 220. FIG. 6a depicts a first embodiment 220a with separate data transfer and power transfer ports 222 and 224. FIG. 6b depicts a second embodiment 220b with a combined data transfer and power transfer port 227. FIG. 6c depicts a third embodiment 220c with the data transfer port 222 partitioned into a data input port 222a and a data output port 222b. Similarly, the power transfer port in the third embodiment 220c is partitioned into a power output port 224a and a power input port 224b. Partitioning the data transfer and power transfer ports may simplify the port circuitry of the device 220c and enable simultaneous connection of the power module 220c to a charging station 230 and a geophysical data acquisition device 210. In addition to the ports 222 and 224, each embodiment 200a, 200b, and 200c may include a connection detector 223, a controller 225, a data transfer memory 226, and a battery 228.

The data transfer port 222 may enable the power module 220 to extract geophysical sensor data from a geophysical data acquisition device 210. The extracted data may be stored in the data transfer memory 226. The data transfer port 222 may also enable the power module 220 to provide the geophysical data to the charging station 230.

The data transfer memory 236 may comprise non-volatile storage devices, such as flash memory devices or disk storage devices that are able to retain data without being powered.

The power transfer port 224 may enable receiving power from a charging station 230, storing power with the battery 228, and providing power to a geophysical data acquisition device 210. In some embodiments, the power transfer port 224 and the data transfer port 222 are combined into a common port 227 (see FIGS. 2b and 6b). For example, both power and data could be transferred via a port 227 that conforms to the Power Over Ethernet standard or by amplitude, frequency, or phase modulation of an alternating magnetic flux on an inductively coupled port 227. In one embodiment, the reluctance of a magnetic flux path in a power-receiving device 220 or 210 is varied in order to transmit data to a power-transmitting device 220 or 230. The change in reluctance may be sensed by the power-transmitting device 220 or 230 and used to extract a data signal therefrom.

Similar to the connection detector 213 and the connection detector 233, the connection detector 223 may detect when the data transfer port 222 and/or the power transfer port 224 are connected to corresponding ports on a geophysical data acquisition device 210 or a charging station 230. The connection detector 223 may alert the controller 225 when such a connection occurs. In one embodiment, the connection detector 223 alerts the controller 225 when it senses a change in the inductive loads of the data transfer port 222 and/or the power transfer port 224.

The controller 225 may initialize the components of the power module 220 and respond to interrupts generated by those components. For example, the controller 225 may respond to an interrupt generated by the data transfer port 232 indicating that a data reception or data transmission event has occurred. The controller 225 may execute specific functions in response to those events. The controller 225 may be a microcontroller, an embedded state machine, or the like.

Figure 7:
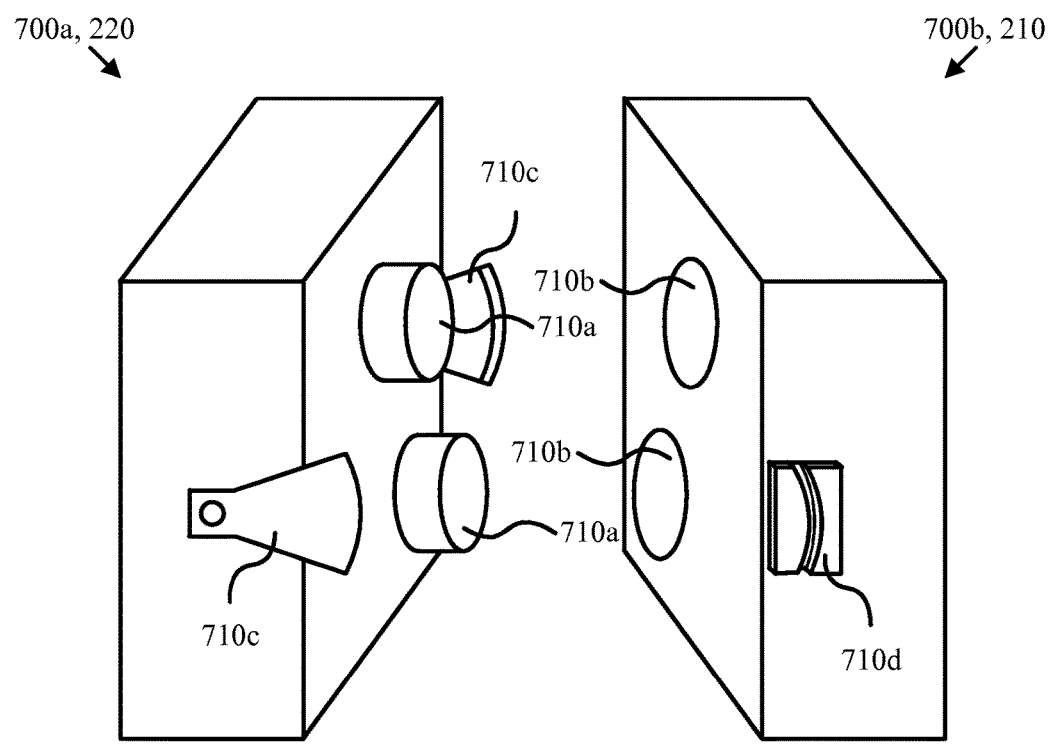
FIG. 7 is a perspective view of attachable cases that may house the geophysical data acquisition device and the power module.

FIG. 7 is a perspective view drawing of attachable cases 700 that may house the geophysical data acquisition device 210 and the power module 220. As depicted, the attachable cases 700 include a first case 700a and a second case 700b. The depicted attachable cases include a number of mating elements 710 including protrusions 710a, recesses 710b, latches 710c and a latch receptor 710d. Another latch receptor 710d is hidden from view.

The mating elements 710 facilitate physically binding the power module 220 to a geophysical data acquisition device 210 or a charging station 230. The attachable cases 700 are one example of providing mating elements 710 that physically bind the geophysical data acquisition device 210 to the power module 220. In another embodiment (not shown), the devices 210 and 220 are physically bound by inserting the devices into an enveloping case or the like. In yet another embodiment (not shown), the devices 210 and 220 are physically bound with an adjustable, or elastic, encompassing band. Physically binding the devices 210 and 220 together may be advantageous in applications where the devices are subject to various forces such weathering forces and rockslides associated with mountainous locations, and turbulent forces associated with ocean-bottom geophysical surveys.

Figure 8A:
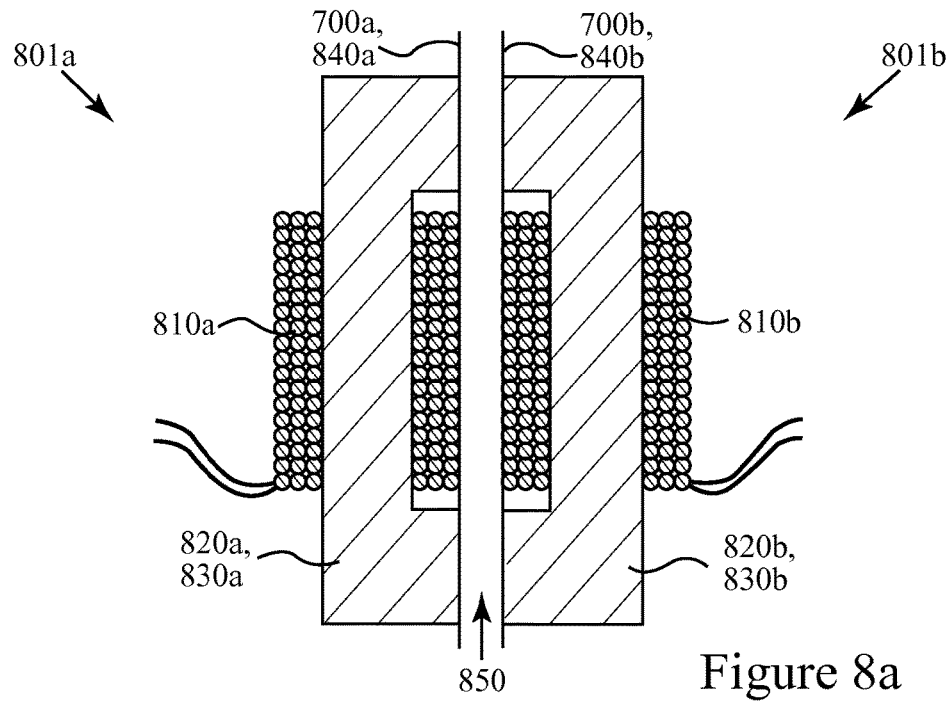
FIG. 8a is a cross-sectional view of an inductive coupler and FIG. 8b is a cross-sectional view of an attachable inductive coupler.
Figure 8B:
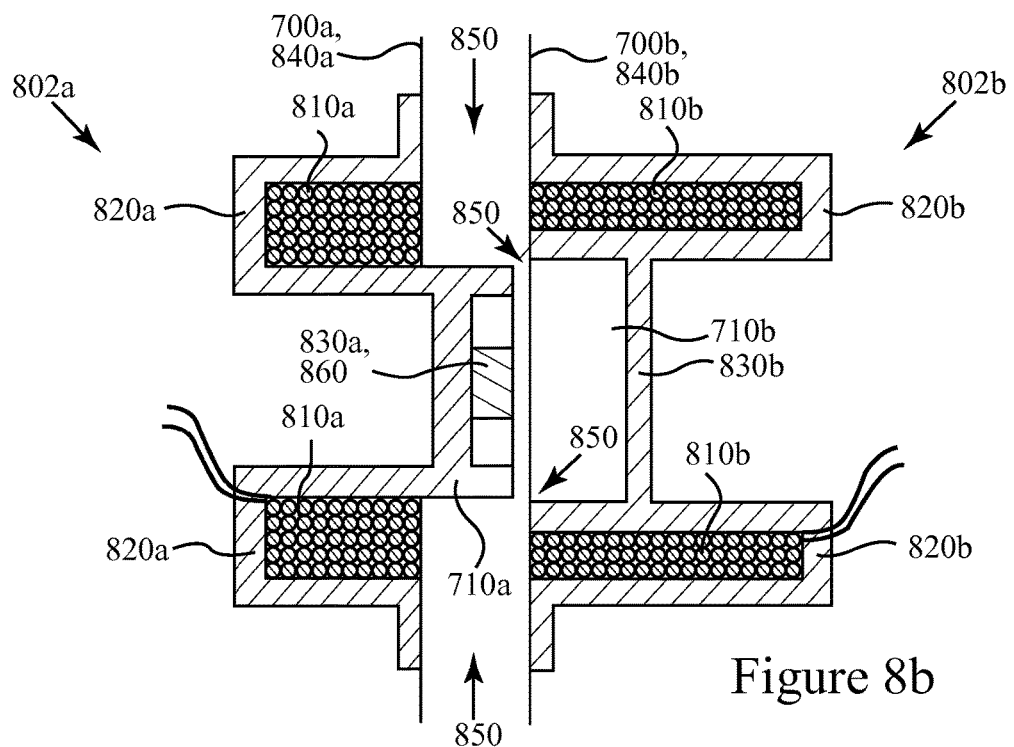

FIG. 8a is a cross-sectional view of an exemplary inductive coupler 801 and FIG. 8b is a cross-sectional view of an attachable inductive coupler 802. As depicted, the inductive couplers 801, 802 include windings 810, soft magnetic cores 820, magnetic elements 830 and case walls 840. Each of the proceeding features 801, 802, 810, 820, 830, and 840 are appended with a letter 'a' for a left instance of a particular feature and a letter 'b' for a right instance of the particular feature.

The windings 810 facilitate driving and sensing a magnetic flux that circulates in the magnetic cores 820 while bridging a magnetic gap 850 that results at the interface of the inductive cores with a case wall 840 of the cases 700. The magnetic cores 820 may be shaped to increase the cross-sectional area that is adjacent to the magnetic gap 850. Increasing the cross-sectional area that is adjacent to the magnetic gap 850 may increase the efficiency of the inductive couplers 801, 802.

The magnetic elements 830a, 830b may be attracted to each other and facilitate aligning the left and right instances of the inductive couplers 801, 802 while also aligning the cases 700 that contain the inductive couplers and holding those cases adjacent to each other. With the inductive coupler 802 of FIG. 8b, a small permanent magnet 860 such as a button magnet enables magnetic attraction of the magnetic elements 830a, 830b without activating one of the coils 810. In contrast, magnetic attraction of the (soft) magnetic elements 830a, 830b only occurs in the inductive coupler 801 of FIG. 8a, when one of the coils 810 is activated. The size of the permanent magnet 860 may be selected to be sufficiently small to avoid saturating the magnetic cores 820 with magnetic flux previous to activating one of the coils 810.

One of skill in the art will appreciate that the construction of the inductive couplers 801, 802 is essentially that of a transformer where the windings are separated enough to isolate each side (a, b) from each other, but allow the magnetic coupling to occur through the case walls 840a, 840b, which may be formed from a non-magnetic material such as plastic. One of skill in the art will also appreciate that the cases 700a, 700b may provide a waterproof barrier that enables deployment of the geophysical data acquisition device 210, and the power module 220, in harsh environments including shallow and deep water deployments.

FIG. 9 is a block diagram of a deployment and maintenance system 900 for geophysical sensing. As depicted, the deployment and maintenance system 900 includes deployment equipment 910, robotic equipment 920, data aggregation devices 930, data processing equipment 940, one or more data analysis workstations 950, and a data communication network 960. The deployment and maintenance system 900 enables deployment and maintenance of the geophysical sensing nodes 110.

Each geophysical sensing node 110 may be formed by combining a geophysical data acquisition device 210 with a power module 220. The geophysical sensing nodes 110 may be deployed as an array, or the like, within a survey such as the rolling geophysical survey 100 shown in FIG. 1b and incorporated into the deployment and maintenance system 900 as depicted in FIG. 9.

Continuing to refer to FIG. 9, while still referring to FIGS. 7 and 8, the waterproof and connector-free connection provided by the inductive couplers 801, 802, or similar wireless ports disclosed herein, in conjunction with waterproof cases such as the cases 700a and 700b, may enable deployment of geophysical sensing nodes 110 in a variety of harsh environments including land, shallow water, and deep water environments. However, the deployment and maintenance system 900 is not limited to harsh environments and does not require wireless ports and waterproof cases for the geophysical data acquisition devices 210 and the power modules 220.

For example, in a land application a number of geophysical sensing nodes 110 could be formed by electrically connecting a geophysical data acquisition device 210 to a power module 220 and deployed by conventional means. The conventional means may include manually "planting" the nodes 110 on the surface or using deployment equipment 910 such as hole boring equipment to drill holes for deploying the nodes 110 underground. In addition to conventional means, the robotic equipment 920 may facilitate placement and retrieval of the geophysical sensing nodes 110 or modular components thereof.

The deployed connected devices 210, 220 would then function as geophysical sensing nodes 110 and symbiotically acquire data with each power module 220 transferring power to a corresponding geophysical data acquisition device 210 and each geophysical data acquisition device 210 sending data to the data transfer memory 226 of the corresponding power module 220.

For example, as shown in FIG. 1b, the seismic source 120 may generate a wave that propagates through the subsurface of the earth. The subsurface structure of the earth within the survey 100 may reflect the wave generated by the seismic source resulting in multiple reflected images of the seismic source 120 propagating within the subsurface. Each geophysical sensing node 110, whether on land, in shallow water, or in deep water, may record a unique waveform that is a summation of delayed versions of the original generated wave and the reflected images. The geophysical sensing nodes 110 may be configured to only record data that exceeds a selected energy level, or the like.

The nodes 110 may be moved or "rolled" as required within the survey 100. Moving the geophysical sensing nodes 110 may include dispatching a technician (not shown), or the robotic equipment 920, to access the geophysical sensing nodes 110. When each geophysical sensing node 110 is accessed, a charged (and cleared of data) power module 220c could then be swapped for the exhausted (and potentially full of data) power module 220d, and the geophysical sensing node 110 quickly redeployed.

The exhausted (potentially full of data) power module 220d, would then be attached to a charging station 230, or the like, to have its data copied and the battery recharged. The geophysical data collected from each exhausted power module 220b by a charging station 230 may then be aggregated by one or more data aggregation devices 930, copied to permanent storage media (not shown), verified by quality control personnel, processed by the data processing equipment 940, and analyzed by geophysicists, or the like, at one or more data analysis workstations 950. In addition to enabling deployment of autonomous geophysical sensing units to a variety of environments with the same modular geophysical sensing node 110, the solutions described herein enable geophysical data acquisition and aggregation in a variety of environments with the same modular unit.

One of skill in the art can appreciate the simplicity of the various embodiments provided herein and the many benefits provided thereby. For example, the embodiments described herein enable the uploading of acquired geophysical data concurrent with recharging the batteries needed for deployment. Consequently, data upload bottlenecks—particularly with high data volume projects—may be eliminated. The embodiments described herein also enable faster redeployment, reduced maintenance costs, and enable efficient data handling for high productivity vibroseis, or the like. The need for additional acquisition nodes, which are often very expensive, is also eliminated. Additionally, the wireless embodiments presented herein eliminate the need for electrical connectors and the issues that plague electrical connectors, such as data loss due to poor coupling and/or physical element intrusion. Furthermore, by deploying geophysical sensing nodes, the issues and costs related to installing and maintaining data collection cables are eliminated. Thus the embodiments presented herein provide additional incentives to deploy autonomous geophysical sensing nodes in geophysical sensing applications.

The embodiments disclosed herein provide methods and systems for efficiently managing geophysical sensing units. It should be understood that this description is not intended to limit the invention. On the contrary, the described embodiments are intended to cover alternatives, modifications and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the disclosed embodiments are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for acquiring geophysical data, the method comprising:
   connecting a power module comprising a data transfer port and a power transfer port to a geophysical data acquisition device to provide a geophysical sensing node;
   deploying the geophysical sensing node and recording geophysical data therewith;

transferring the geophysical data from the geophysical data acquisition device to the power module via the data transfer port and transferring power from the power module to the geophysical data acquisition device via the power transfer port;

retrieving the geophysical sensing node from a trailing edge of a rolling active spread, and replacing the power module with a newly charged power module to provide a newly charged geophysical sensing node;

deploying the newly charged geophysical sensing node at a leading edge of the rolling active spread; and while a rolling survey continues, connecting the power module to a charging station to transfer data to and/or to receive power from the charging station before reusing the power module to replace another power module of another geographical sensing node.

2. The method of claim 1, wherein the data transfer port and the power transfer port are the same port.

3. The method of claim 1, wherein the power transfer port is configured to inductively couple to a power input port of the geophysical data acquisition device.

4. The method of claim 1, wherein transferring data from the geophysical data acquisition device to the power module and transferring power from the power module to the geophysical data acquisition device occur while the geophysical data acquisition device is deployed and actively acquiring data.

5. A system for acquiring geophysical data, the system comprising:

a plurality of geophysical sensing nodes, each geophysical sensing node thereof comprising a geophysical data acquisition device connected to a power module, the power module configured to receive data from the geophysical data acquisition device via a data transfer port on the power module and provide power to the geophysical data acquisition device via a power transfer port on the power module;

a charging station configured to connect to one or more power modules and receive data from the one or more power modules and provide power to the one or more power modules; and a robotic equipment configured to retrieve one or more of the geophysical sensing nodes, to replace the power module of any retrieved geophysical sensing node with a charged power module, and to redeploy the retrieved geophysical sensing node during a rolling survey, and, while the rolling survey continues, to provide the retrieved power module to the charging station to be charged and/or to transfer the data, wherein the robotic equipment retrieves one of the geophysical sensing nodes from a trailing edge of a rolling active spread, and redeploys the one of the geophysical sensing nodes at a leading edge of the rolling active spread.

6. The system of claim 5, wherein the plurality of geophysical sensing nodes form the active spread.

7. The system of claim 5, wherein the power transfer port is a wireless inductively coupled port.

8. The system of claim 5, wherein the charging station comprises a power output port configured to connect to the power transfer port.

9. The system of claim 8, wherein the charging station comprises a power supply module configured to provide power to the power output port.

10. The system of claim 5, wherein the charging station comprises a data input port configured to connect to the data transfer port.

11. The system of claim 5, wherein the power module comprises a data transfer memory configured to store geophysical data.

12. The system of claim 5, wherein the power transfer port and the data transfer port are the same port.

13. The system of claim 5, further comprising:
data processing equipment for processing data acquired by the plurality of geophysical sensing nodes.

14. The system of claim 5, further comprising:
one or more data analysis workstations.

15. The system of claim 5, wherein the power module is recharged from the charging stations via a second power transfer port distinct from the power transfer port, and/or transfers data to the charging station via a second data transfer port different from the data transfer port.

16. The system of claim 5, wherein the robotic equipment uses Global Positioning System, GPS, to retrieve and redeploy the one or more geophysical sensing nodes.

17. The system of claim 5, wherein each power module includes a connection detector to detect whether the data transfer port and/or the power transfer port is connected.

* * * * *